UNITED STATES PATENT OFFICE.

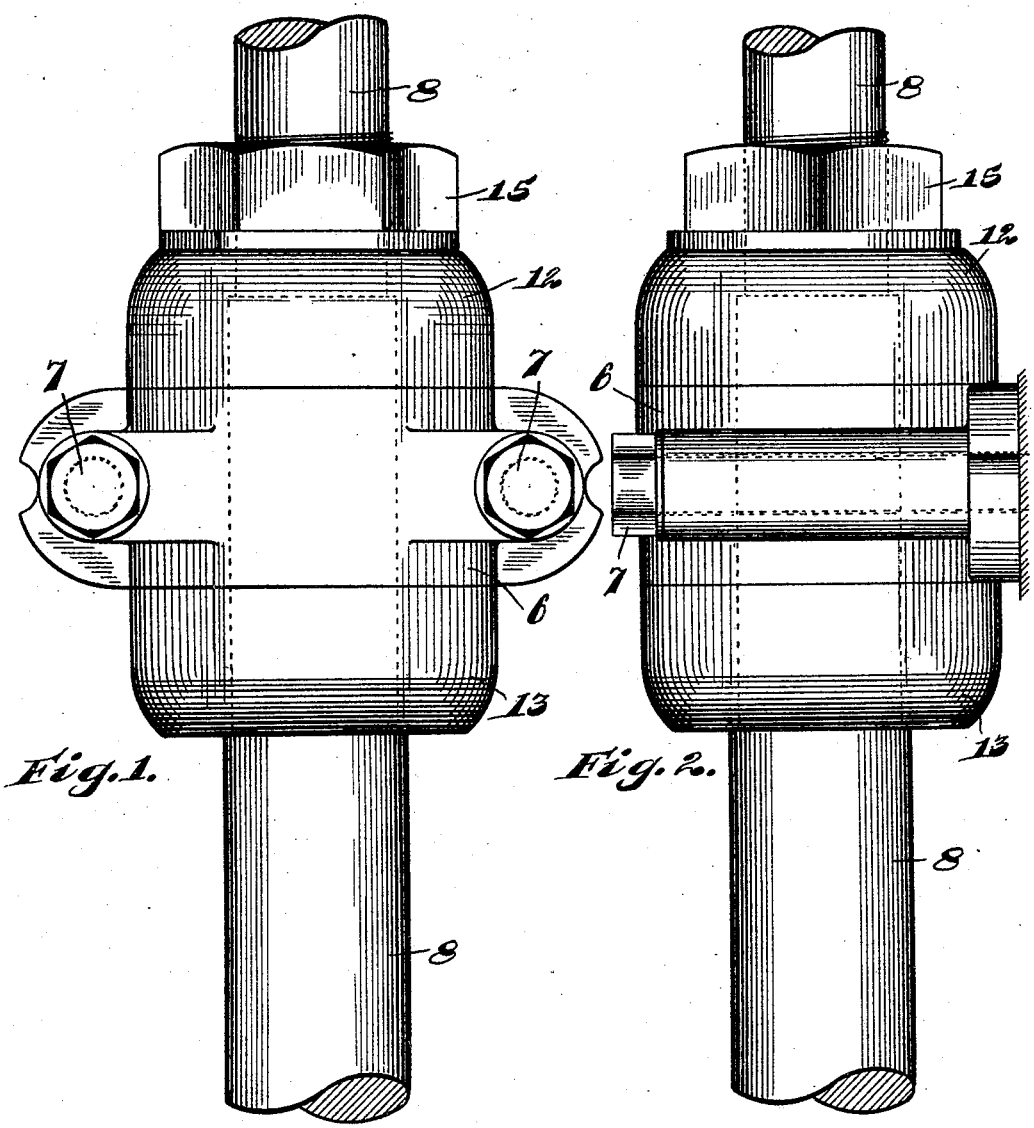

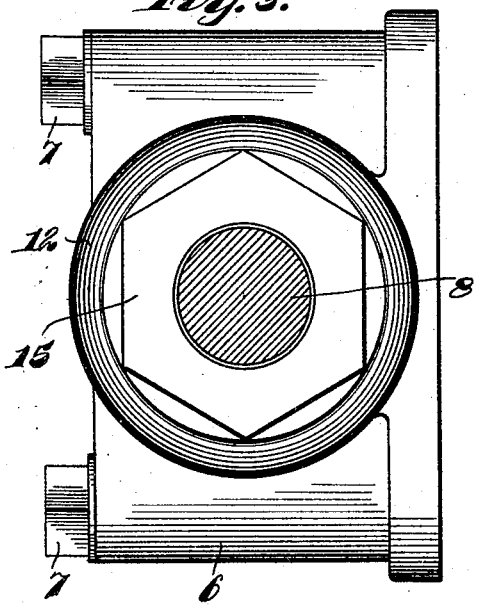
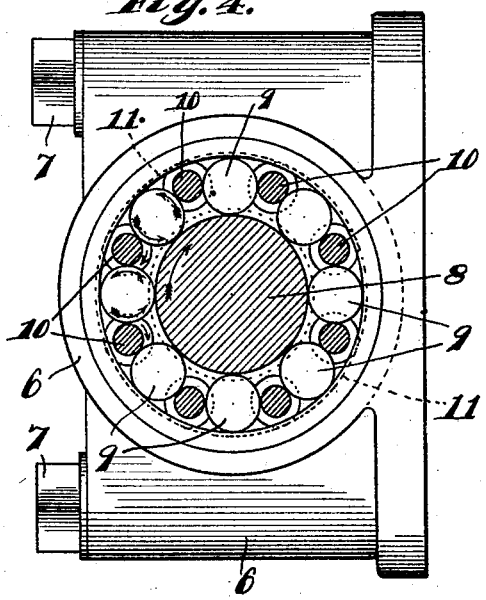
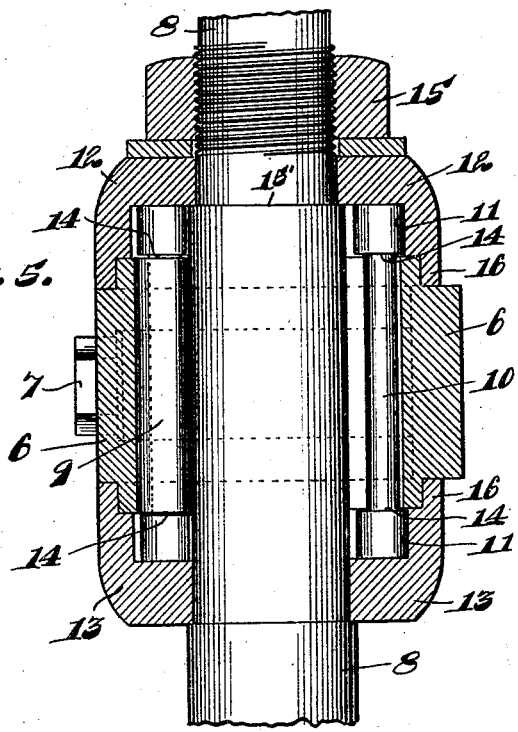

ROBERT G. BODLUND, OF CHICAGO, ILLINOIS.

ROLLER BEARING.

1,416,164.  Specification of Letters Patent.  Patented May 16, 1922.

Application filed January 2, 1919. Serial No. 269,208.

*To all whom it may concern:*

Be it known that I, ROBERT G. BODLUND, a citizen of the United States, and a resident of the city of Chicago, county of Cook, and State of Illinois, have invented certain new and useful Improvements in Roller Bearings, of which the following is a specification.

My invention relates to improvements in roller bearings for shafts and other rotating elements, and has for its object the production of a bearing of this character in which the friction will be reduced to a minimum and which will be of durable and economical construction.

Other objects will appear hereinafter.

The invention consists in the combinations and arrangements of parts hereinafter described and claimed.

The invention will be best understood by reference to the accompanying drawings forming a part of this specification, and in which, Fig. 1, is a front elevation of a bearing embodying the invention, a fragment of shaft being shown mounted therein, Fig 2, a side elevation of the construction seen in Fig. 1, Fig. 3, a top plan view of the construction seen in Fig. 2, Fig. 4, a view similar to Fig. 3, with one of the bearing members carried by the shaft removed, and Fig. 5, a central vertical section through the construction.

The preferred form of construction, as illustrated in the drawings, comprises a tubular housing 6 which is adapted to be secured by bolts 7 to any convenient support. Rotatably mounted in housing 6 is a shaft 8. Arranged in said housing and surrounding said shaft is a plurality of rollers 9 and 10, said rollers 9 and 10 being arranged in alternate relation and having rolling contact with each other. The rollers 9 contact with both the shaft and housing 6, having rolling contact with each.

The rollers 10 are longer than the rollers 9, the opposite ends thereof protruding from the opposite ends of the housing into rolling contact with internal annular raceways 11 formed in bearing members 12 and 13, which are carried by shaft 8. The central portions of rollers 10 are reduced in diameter to avoid contact with either the shaft or the housing, the provision of such central reduced portions in said rollers resulting in the formation of shoulders 14 with which the ends of rollers 9 engage, and whereby the latter are held against relative longitudinal shifting.

The bearing member 13 is locked to shaft 8 by being pressed thereon, whereas the bearing member 12 is secured to said shaft by a nut 15 which compresses said bearing member against a shoulder 15' formed upon the shaft.

The inner ends of bearing members 12 and 13 overlap and loosely engage with the adjacent ends of housing 6, forming a tight connection therewith in order to exclude dirt or other foreign substances.

With the construction set forth it will be seen that an arrangement is provided whereby the rollers 9 will constitute the bearings proper for the shaft, said rollers contacting at their inner sides with the shaft, and at their outer sides with the housing 6. Said rollers will be held in spaced relation by the rollers 10, which do not contact with either the shaft or said housing, the same contacting only with the rollers 9 and the bearing members 12 and 13. The result of this arrangement is that in the rotation of the shaft, rollers 9 will rotate in one direction, that is, the direction imparted thereto by reason of the movement of the shaft, and the rollers 10 will be rotated in the opposite direction through contact of the same with the rollers 9. Said rollers 9, in this rotation thereof, rotate idly in contact with the bearing members 12 and 13 at their ends. With this arrangement it will be seen that said rollers 10 constitute spacing elements for the rollers 9 and allow for the desired freedom of rotation thereof, avoiding the friction which would otherwise result did the rollers 9 contact directly with each other. The arrangement produced reduces friction to a minimum and provides a bearing which will necessitate but very little lubrication.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention, what I claim as new and desire to secure by Letters Patent is:—

The combination with a tubular housing, of a shaft journalled through said housing, bearing members rigidly mounted on said shaft and loosely engaging the opposite ends of said housing; a plurality of rollers mounted in said housing and surrounding and contacting with the periphery of said shaft; raceways formed in each of said bearing members; rollers having reduced central portions mounted in said raceways between said first-mentioned rollers, said reduced portion of each of said rollers contacting with the periphery of said first-mentioned rollers and adapted upon rotation of said first-mentioned rollers to rotate in the opposite direction of the said shaft, the ends of said reduced rollers serving as shoulders preventing the longitudinal movement of said first-mentioned rollers, substantially as described.

In testimony whereof I have signed my name to this specification in the presence of two subscribing witnesses.

ROBERT G. BODLUND.

Witnesses:
JOSHUA R. H. POTTS,
HELEN F. LILLIS.